Feb. 11, 1958 J. R. WATSON 2,822,608

METHOD OF MAKING AND ASSEMBLING DIFFERENT ELEMENTS

Filed Sept. 7, 1955 2 Sheets-Sheet 1

INVENTOR.
John R. Watson
BY
Barlow & Barlow
ATTORNEYS.

Feb. 11, 1958 J. R. WATSON 2,822,608

METHOD OF MAKING AND ASSEMBLING DIFFERENT ELEMENTS

Filed Sept. 7, 1955 2 Sheets-Sheet 2

INVENTOR.
John R. Watson
BY
Barlow & Barlow
ATTORNEYS.

United States Patent Office 2,822,608

Patented Feb. 11, 1958

1

2,822,608

METHOD OF MAKING AND ASSEMBLING DIFFERENT ELEMENTS

John R. Watson, Bristol, R. I., assignor to B. A. Ballou & Co. Incorporated, a corporation of Rhode Island Application September 7, 1955, Serial No. 532,900

5 Claims. (Cl. 29—416)

The invention relates to a method of making and assembling separate elements together into a unit.

An object of the invention is to provide a method for making from a single piece of suitable material separate parts of a unit structure and assembling the parts together prior to severing from the parent stock and discharge from the machine.

Another object of the invention is to provide a method for automatically making on a screw machine from a single piece of suitable bar stock separate parts of a unit structure and assembling the parts together prior to severing of the unit from the parent stock.

A more specific object of the invention is to provide a method for automatically making from a single length of bar stock a button back body and rotor assembled thereto prior to severing from the parent stock.

Figure 1:
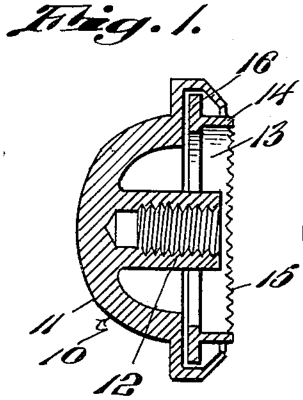
Figure 1 is a cross sectional view of a button back assembly made according to the present invention.

The invention contemplates broadly automatically making from a single bar of suitable material different elements which are to be assembled together prior to discharge from the working zone of the machine which may be adapted for use in performing the various required machine operations. As by way of example, two different members rotatively secured to each other may be formed or partially formed by a continuous series of automatic machine operations, then severing one of the said members from the bar and directly assembling it with the other member prior to severing the second member from the bar.

The invention will be described in detail as embodied in making from a single piece of bar stock a button back 10 (see Figures 1 and 2) having a hollow body 11, a central internally screw threaded post 12, and a rotor 13 in the form of an annulus 14 having a knurled edge 15 and a flange 16.

The various steps illustrated in Figures 3 to 12 for making the button back may be performed on a suitable metal cutting machine tool. A screw machine which has automatically operated feeds, tool carrying slides, and turret is particularly adapted for performing the various machine operations required. A cylindrical bar 17 of suitable material and of a diameter slightly larger than the finished diameter of the button back 10 is positioned to be held in the jaws 18 of the screw machine to be rotated thereby for the various metal removing or manipulating operations to take place. The end of the bar 17 is faced so as to square the same with the axis of the bar as by means of a facing operation which may be performed simultaneously during the severing of the finished button back from the parent stock as will hereinafter appear. A center hole 19 is made in the end of the bar, and the 2 end of the bar is serrated or knurled as at 20. The order in which these two latter operations take place is not critical, and either operation may follow the other.

Figure 4:
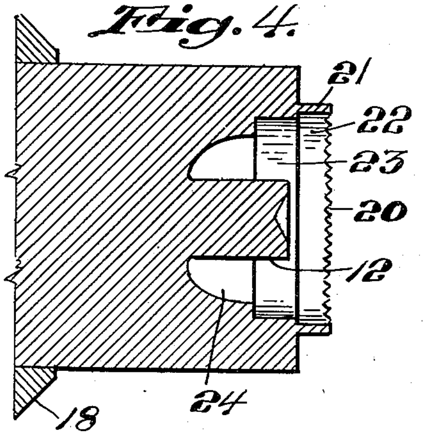

The end portion of the bar 17 is next reduced as at 21 inwardly a distance equal to the axial length of annulus 14 less the thickness of the flange 16 and to a diameter equal to the diameter of the annulus 14. The bar 17 is next hollowed out axially thereof, as by means of a boring operation, to form as shown in Figure 4 the center post 12, bore sections 22, 23, and the inner arcuate cavity 24 adjoining the section 23 and of smaller diameter. The depth of section 22 is made less than the total length of the rotor 16, and section 23 is made of smaller diameter than section 22. The bore 23 is next enlarged as at 25 (see Figure 5) as by means of a recessing operation inwardly of the knurled edge 20 a distance equal to the total length of the rotor 13 so as to provide on the outer side of the enlarged bore or recess 25 a wall portion 26 equal in thickness to the flange 16 and an inner annular flange or abutment 27. The peripheral wall 28 of the recess 25 is joined to the inner side of the wall 26 by a fillet 29 (see Figures 5 and *5a*). The fillet affords a means of controlling the diameter of the flange 16 as will hereinafter appear. The center post may now be bored and tapped as shown at 12D and 12T in Figures 6 and 7. The above machine operations described are well known in the screw machine art and may be performed automatically to follow each other in the proper sequence according to the dictates of tooling practice which may be peculiar to different makes of screw machines.

Figure 2:
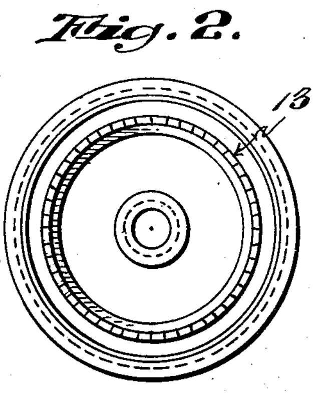
Figure 2 is a face view of the button back of Figure 1.
Figure 3:
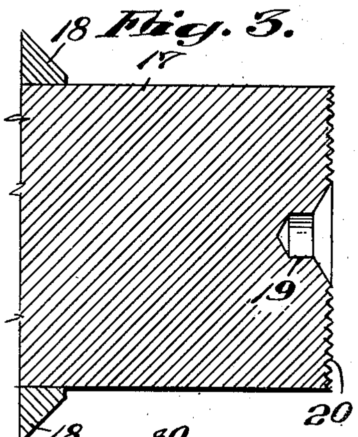
Figures 3 to 12 are sectional views illustrating various steps in the making of the button back of Figure 1.
Figure 5:
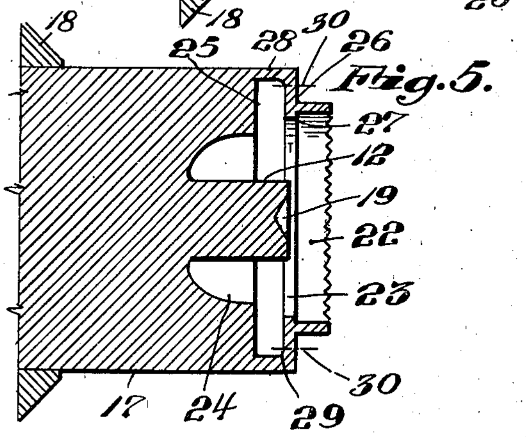
Figures 5A, 6:
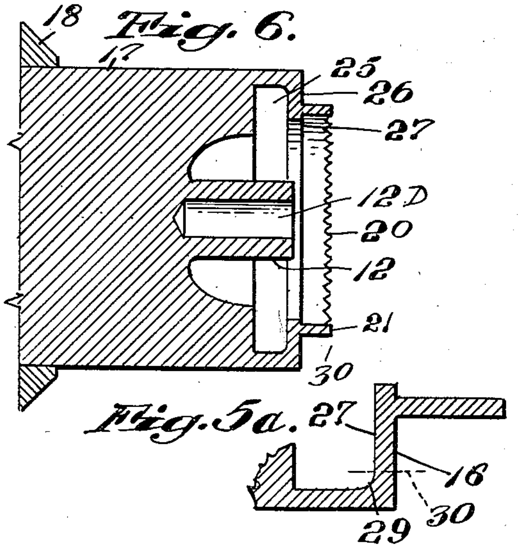
Figure 7:
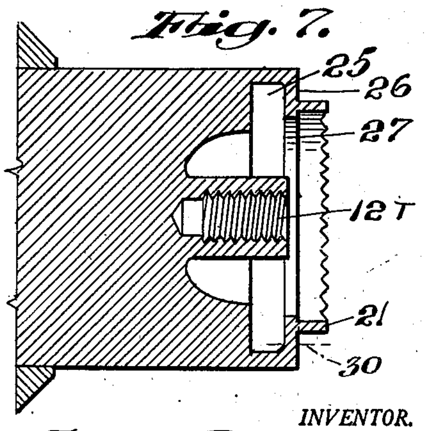

With reference to Figure 5, it will be seen that the end of bar 17 has been fabricated into the rotor of Figure 1 from inwardly of the junction of the fillet 29 with said wall 26 as indicated in a broken line 30 (see Figure 5). The wall 26 forms the flange 16 of the rotor 13. It will also be seen with reference to Figure 7 that the cavity and post 12 of the body 11 of Figure 1 has likewise been formed.

The rotor part may now be severed from the bar 17 or parent stock. According to the invention the rotor is held axially during the severing operation by means of a rolling or spinning tool 31 which has a slidable plunger 32. The tool 31 may be attached to the turret of the screw machine to be moved thereby axially of the axis of the bar 17. The tool 31 has a central bore 33 extending therethrough from one end to the other which is counterbored at a number of points to provide sections 34, 35, 36, and 37 of different diameters. The section 34 is outwardly tapered at substantially a 45° angle and forms a funnel-like opening to the bore section 35. The section 37 is internally screw threaded at the outer end portion as at 38 and at its inner end forms with the section 36 a shoulder 39. A sleeve 40 is screw threaded into the end 38 and forms a shoulder or abutment 42 opposite to shoulder 39.

The plunger 32 is slidably received in the section 36 and has an enlarged head 43 which is yieldingly held against the shoulder 39 by a compression coil spring 44 which is arranged in the section 37 with one end thereof engaging against the head 43 and the other end thereof against the abutment 42 which may be adjusted so as to control the pressure of spring 44. The diameter of the plunger body is made to be frictionally received in the bore section 22 of the rotor 11. The extreme end portion 45 of the plunger is reduced in diameter to be readily passed through the bore of abutment 27 and forms a shoulder 46 adapted to engage abutment 27. The plunger has a bore 32' therethrough which is of a diameter larger than the post 12.

Figures 8, 9, 10, 11, 12, 13:
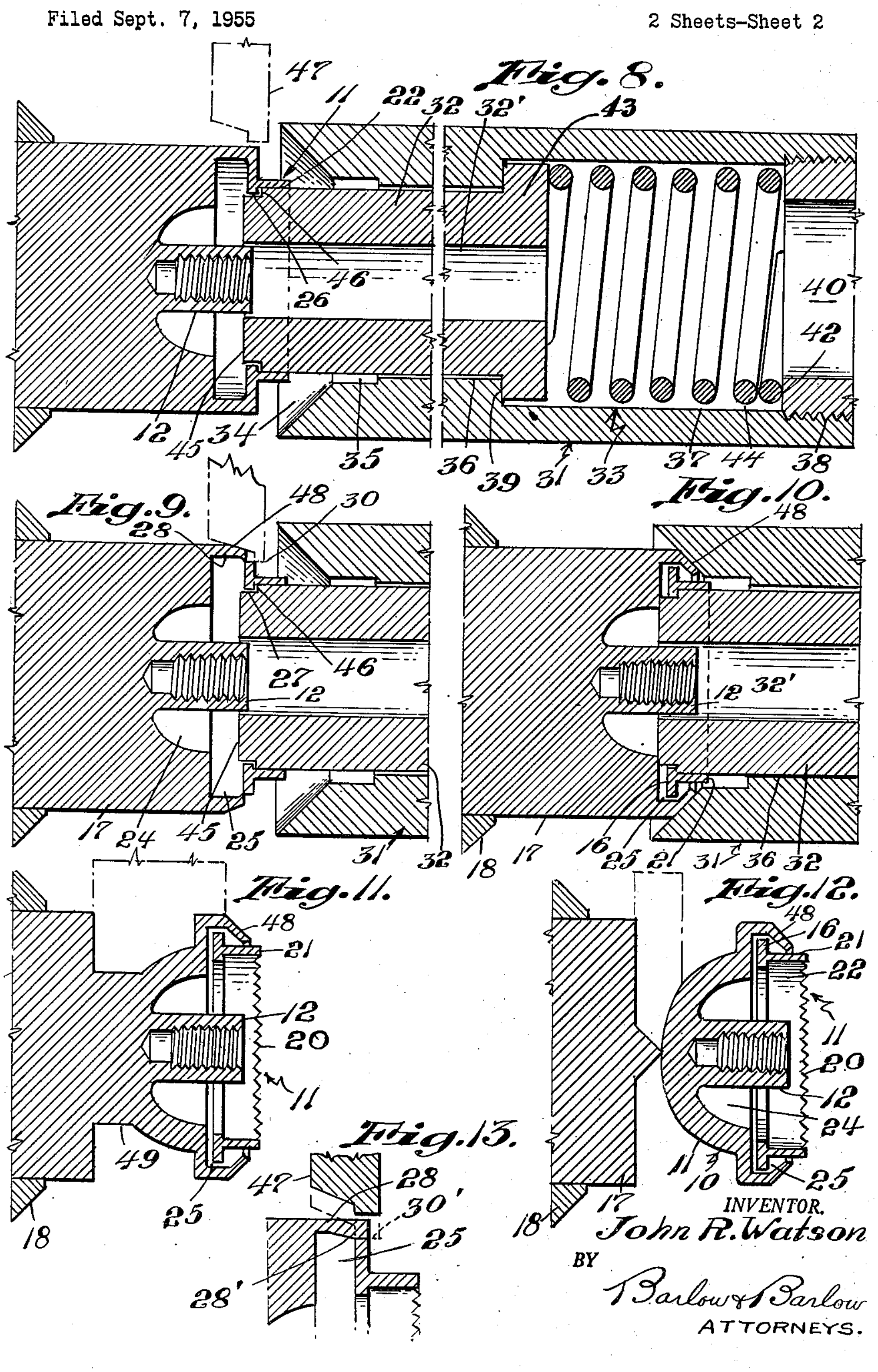
Figure 13 is a cross sectional view of a modified construction.

Prior to the operation of severing the rotor 11 from the bar 17 by means of a suitable severing or parting tool as indicated in broken lines 47, tool 31 is advanced to engage the plunger in the bore 22 of the rotor 11. It will be understood that during the various machine operations, a coolant will be applied in a sufficient flow to disperse the metal chips and the heat generated by the metal cutting tools and the relative rotation between the rotor 11 and plunger 32 which is relatively non-rotatable. The rotor 11 is now severed by cutting into the wall 28 inwardly from the outer side of walls 26 to a point in line with the inner side of said wall 26 and to a depth or diameter indicated by the broken lines 30 (Figure 5; see also Figure 9). During the above turning operation the outer periphery of wall 28 is tapered as at 48 to thin the same towards the outer edge thereof. Upon the cutting operation reaching the said diameter, the rotor will be severed from the bar 17. The friction between the rotor and the plunger 32 will cause the rotor to stop rotating and further cutting of material from the flange 16 will stop. There is a necessary over-travel of the severing tool 47 which will continue to travel in the same direction and apply pressure on the edge of the now stationary held flange 16 to be transmitted on the plunger 32, which has sufficient clearance in bore section 36 to yield axially under said pressure, the pressure of spring 40 returning said plunger axially upon the return of tool 47.

Referring to Figure *5a*, it will be seen that the severing of the flange 16 from the bar 17 will be at the junction of the fillet 29 and inner side of wall 27. Consequently, the diameter of the flange 16 is predetermined upon the size of the fillet, the larger the fillet, the smaller the diameter of the flange, and the smaller the fillet, the larger the diameter of flange. Thus, I am able to control the desired clearance between rotor and recess 25 in which the rotor rotates. The diameter of flange 16 may also be controlled by making the inner side of wall 28 tapered as shown at 28' in Figure 13. The bar 17 is turned inwardly as above described to a depth indicated in broken lines 30', which is at the junction of the taper 28' and inner side of wall 27.

Upon severing of the rotor 13 from the bar 17, the rotor is carried inwardly into recess 25, and the wall 28 is turned inwardly to overhang the flange 16 to secure the same within the recess. These two operations are carried out by means of tool 31 which is further advanced toward bar 17 which carries the rotor into recess 25. Any tendency of inward movement of the rotor along plunger 32 is prevented by shoulder 46 engaging against the ring or abutment 27. The end of plunger 32 will engage against the inner wall of recess 25 and prevent further axial movement thereof. Further axial travel of tool 31 in the same direction will engage the tapered wall of section 34 with wall 28 (see Figure 10) and the continued travel of the tool in the same direction will apply a force on said wall 28 and provide a spinning action or operation to inwardly turn the end portion of said wall 28 to overhang and secure the rotor in position.

The outer contour of the body portion 11 next may be made, preferably by means of two turning operations, the first turning operation to partially form the outer side of the body 11 to the desired contour to a depth on the bar to leave a connecting neck portion 49 of substantial thickness as shown in Figure 11; the second of the two turning operations removes the remainder of the stock as shown in Figure 12 to finish the outer contour of the body and to sever the now finished button back from the parent stock. The latter turning operation is made in conjunction with a facing operation which squares the now new end of the bar in readiness for another complete cycle of operation thereon as above described.

From the above description it will be apparent that the various operations in fabricating the button back may be performed on a screw machine wherein the turning tools may be carried on the cross slides of the machine and the axially operating tools, such as the centering, boring, threading, and spinning tools may be carried on the turret of the machine wherein the sequence of the various operations may take place automatically in proper order as by way of example, feed the bar to a stop; knurl and center end of bar; bore and form rotor; form recess in body of button back; drill for tap; tap, cut rotor free of parent stock; carry and hold rotor in recess, roll or spin edge of recess wall to overhang flange of rotor; form outside contour of button back body; then cut off. The sequence of the order of operation is merely given as an example and may be changed to suit the tool practice of the particular machine employed in practicing the invention.

I claim:

1. The method of making from a continuous rotating single length of bar material different elements and assembling said elements one within the other comprising reducing the end of the bar into the form of the inner of the said elements, and forming a recess adjacent to the rear side of said inner element larger than the diameter of said inner element, severing said inner element from the bar while holding the same in axial alignment with the bar, then with the said severed element still held in said axial alignment advancing the same within said recess and thereafter bending the marginal peripheral wall of the recess about the inner element to secure the same within the recess.

2. The method of making from a continuous rotating single length of bar material two separate elements and movably securing the elements one with the other prior to severing the assembled elements from the said bar comprising the steps of forming the end portion of the bar to the form of the inner of said elements, making a recess in the bar at the rear of said inner element larger than the diameter of the said inner element, severing the said inner element from the bar, positioning the said inner element within said recess, bending one wall of the said cavity about the said inner element to secure the same within the said recess and thereafter severing the assembled unit from the bar.

3. The method of making from a continuous rotating single length of bar material two separate elements and securing the elements to each other for relative rotation prior to severing the assembled elements from the said bar, comprising the steps of forming the end portion of the bar to form the inner of said elements, making a recess in the bar directly inwardly of a point in a line defining the inner side of the inner element larger than the diameter of said inner element, severing the inner element from the bar along said line, positioning said severed inner element within said recess, bending the marginal edge of the peripheral wall of said cavity about said inner element so as to rotatively secure the same in position, and thereafter severing the assembled unit from the bar.

4. The method of manufacturing from a continuous rotating single length of bar material a button back with a rotor rotatably mounted therein comprising the steps of reducing the end portion of the bar into the form of the rotor, forming a cavity at the rear of the rotor slightly larger in diameter than the diameter of the rotor, severing the rotor from the bar while holding the same axially of the bar, moving the rotor within the cavity, bending a wall of the cavity about the rotor to secure the same within the cavity, thereafter severing the assembled rotor and body of the button back from the bar.

5. In the method of manufacturing from a continuous rotating single length of bar material a button back with a rotor rotatably mounted therein comprising the steps of forming the end of the bar into the form of the rotor with a flange at one end thereof, recessing said bar at the rear of said flange portion to a diameter greater than the diameter of said flange and with a fillet extending from said diameter to the adjacent marginal edge of the inner peripheral wall of said recess, then reducing the diameter of said bar outwardly from a point in a line with the inner side of said flange portion so as to part said rotor from the bar at the junction of said fillet with said side of the flange, moving said severed rotor to position the flange in said recess and thereafter bending the peripheral wall of said recess about said flange to secure the same within said recess.

References Cited in the file of this patent

UNITED STATES PATENTS

| | | |
|---|---|---|
| 1,193,637 | Van Inwagen | Aug. 8, 1916 |
| 1,930,611 | Freter | Oct. 17, 1933 |
| 1,967,148 | Kurlan | July 17, 1934 |
| 1,982,403 | Snead | Nov. 27, 1934 |
| 2,650,418 | Matheny et al. | Sept. 1, 1953 |
| 2,724,867 | Smith | Nov. 29, 1955 |